US006300047B1

(12) United States Patent
Massucco et al.

(10) Patent No.: US 6,300,047 B1
(45) Date of Patent: Oct. 9, 2001

(54) SUPPORT BASE FOR LIGHT-SENSITIVE PHOTOGRAPHIC ELEMENTS

(76) Inventors: Wilma Massucco; Domenico Marinelli; Piero Cavalleri, all of Ferrania S.p.A., I-70174 Cairo, Montenotte/Ferrania (Savona) (IT)

( * ) Notice: Subject to any disclaimer, the term of this patent is extended or adjusted under 35 U.S.C. 154(b) by 0 days.

(21) Appl. No.: 09/576,522

(22) Filed: May 23, 2000

(30) Foreign Application Priority Data

May 25, 1999 (EP) ............................................... 99110139

(51) Int. Cl.[7] ............................ G03C 1/825; G03C 1/83; G03C 1/835; B32B 7/02; B32B 9/02

(52) U.S. Cl. ......................... 430/519; 430/510; 430/517; 430/522; 428/212; 428/411.1; 428/478.2

(58) Field of Search .................................... 430/510, 517, 430/522, 519, 507; 428/212, 411.1, 478.2

(56) References Cited

U.S. PATENT DOCUMENTS

| | | | | |
|---|---|---|---|---|
| 1,010,141 | * | 11/1911 | Herzka | 430/510 |
| 3,769,019 | | 10/1973 | Wiese, Jr. et al. . | |
| 4,039,333 | | 8/1977 | Shinagawa et al. . | |
| 4,196,002 | | 4/1980 | Levinson et al. . | |
| 4,262,088 | | 4/1981 | Vallarino et al. . | |
| 4,316,984 | | 2/1982 | Brown . | |
| 4,336,323 | | 6/1982 | Winslow . | |
| 4,460,679 | | 7/1984 | Schadt, III . | |
| 4,563,406 | | 1/1986 | Ohbayashi et al. . | |
| 4,904,565 | * | 2/1990 | Schmidt et al. | 430/510 |
| 4,990,434 | | 2/1991 | Van Thillo et al. . | |
| 5,108,883 | * | 4/1992 | Matejec et al. | 430/522 |
| 5,246,823 | | 9/1993 | Shuman . | |
| 5,318,885 | | 6/1994 | Shuman . | |
| 5,366,845 | * | 11/1994 | Inoue et al. | 430/510 |
| 5,976,775 | * | 11/1999 | Ishii | 430/510 |
| 6,045,985 | * | 4/2000 | Cavalleri et al. | 430/517 |

* cited by examiner

*Primary Examiner*—Richard L. Schilling
(74) *Attorney, Agent, or Firm*—Mark A. Litman & Assoc. P.A.

(57) ABSTRACT

The present invention relates to a support base for light-sensitive photographic elements. In particular, the present invention relates to a support base comprising a support having coated thereon at least two antihalation layers over-coated by a protective layer.

The support base for light-sensitive photographic elements of the present invention presents an improved coating quality with a reduced formation of mottle, defined as an irregularly patterned defect due to the tendency of the coated layers to reproduce any deformation present on the support.

13 Claims, No Drawings

SUPPORT BASE FOR LIGHT-SENSITIVE PHOTOGRAPHIC ELEMENTS

FIELD OF THE INVENTION

The present invention relates to a support base for light-sensitive photographic elements. In particular, the present invention relates to a support base comprising a support having coated thereon at least two antihalation layers overcoated by a protective layer.

BACKGROUND OF THE INVENTION

Halation has been a persistent problem with photographic films formed by depositing one or more layers of a photosensitive silver halide emulsion onto a support such as a plastic film. The emulsion diffusely transmits light. Such light reaches the support and is reflected back into the emulsion. The silver halide emulsion is thereby reexposed at a location different from the original one. The result is a halo surrounding an image of a bright object on the film.

Efforts to minimize the effects of halation have included incorporation of silver or silver halide in the support to lower reflection density (see U.K. Patent No. 1,126,797). U.S. Pat. No. 4,460,679 approaches the problem by adding a non-photosensitive layer containing a chemically bleachable, high strength tinctorial colorant, such as blue colloidal silver, over the support which permits sensitometric control over low coating weight silver halide elements. U.S. Pat. No. 4,563,406 discloses a yellow, blue or gray colorant layer, a white pigment layer and a silver halide emulsion layer over the support to achieve the combined effect of increased sharpness without loss of sensitivity.

U.S. Pat. No. 2,921,914 uses a blue colloidal silver dispersion to absorb longer wavelengths of light for halation control. Preparation of this dispersion involves spontaneous nucleation to derive centers for silver formation, and reduction of the silver salt by tannic acid in the presence of a water soluble strontium salt. This technique has hue control problems related to large nuclei, turbidity and difficulties with bleaching. Severe gel slugging (forming hardened globs), a major concern in antihalation silver preparation, is aggravated by the use of tannic acid.

U.S. Pat. Nos. 5,246,823 and 5,318,885 disclose photographic elements including a reflective support, one or more photosensitive silver halide emulsion layers, and a colored antihalation layer interposed between the support and the photosensitive layers. The antihalation layer comprises platelets of silver having a thickness of up to about 20 nanometers (nm) distributed in a suitable matrix or colloidal medium such as gelatin. Due to the thinness of the grains, coverage of up to about 10 mg silver per square foot of the antihalation layer provides a sufficient antihalation effect at reduced silver levels as compared to silver antihalation layers containing larger, thicker grains.

Very often carbon black is used in dispersed form in a binder. A carbon black antihalation layer provides excellent halation protection and has excellent antistatic properties. U.S. Pat. No. 4,990,434 discloses photographic elements comprising an alkali-soluble carbon black antihalation layer on a subbed hydrophobic transparent polyester film support, said subbing layer being adapted to improve the adhesion of said antihalation layer to said subbed film support and at the same time to improve the removability in alkaline solution of said antihalation layer from said subbed film support.

In silver halide photographic materials, aqueous alkaline soluble antihalation layers containing carbon black are used on the backside of the photographic media. These antihalation layers are dissolved and removed during development of the photographic media. Such antihalation layers are shown in U.S. Pat. Nos. 2,271,234; 3,392,022; 4,039,333 and 4,262,088.

The use of bleachable dye-containing layers as antihalation layers is also known in the art. The dyes may be chemically bleachable (e.g., U.S. Pat. Nos. 3,769,019 and 4,336,323) or heat bleachable (e.g., U.S. Pat. Nos. 4,196,002 and 4,316,984).

Each of these systems provide improved halation characteristics to the imaging media, but also provide some additional problems. A particular problem is the poor coating quality; in fact, streaks are generated on the photographic material. Very often, irregularities on the film support base determine a poor quality of the photographic material because the same irregularities of the support base are transferred to the photographic element which is coated overthere. The result is the presence of mottles or streaks.

Photographic material is conventionally constructed as a multilayered element including an electrically insulating support and photographic light-sensitive emulsion layers. This photographic material is susceptible to accumulation of electrostatic charges caused by repeated frictional contacts between the photographic material with surfaces of the same or different kinds of materials, or during peeling operations performed in order to separate superposed materials of the same or different kinds during the manufacture of, or use of, the photographic material. These accumulated electrostatic charges can cause many problems. The most serious problem being that the light-sensitive emulsion layers can be inadvertently sensitized by the discharge of these accumulated electrostatic charges before development processing is performed which results in the generation of dot-like spots, or dendritic or feather-like streaks in the development processed photographic film. These spots and streaks are generally called static marks, and considerably diminish, if not destroy, the commercial value of the photographic film.

It is also known to protect photographic elements against mechanical damage by coating them with a layer comprising a wax. This wax serves as a lubricant and for that reason tends to reduce the formation of scratch markings. However, some lubricants have a deleterious effect on the photosensitive silver halide emulsion, whilst others streak the film surface, thus spoiling the quality of the final image obtained.

SUMMARY OF THE INVENTION

The present invention relates to a support base for light-sensitive photographic elements comprising a support having coated thereon at least two antihalation layers overcoated by a protective layer.

The support base of the present invention presents an improved coating quality, particularly an improvement of the mottle, defined as an irregularly patterned defect due to the tendency of the coated layers to reproduce any deformation present on the support.

DETAILED DESCRIPTION OF THE INVENTION

In a preferred embodiment of the invention, the support base comprises two different antihalation layers, defined as a first antihalation layer that is the one closest to the support, and a second antihalation layer which is coated on said first antihalation layer, said second antihalation layers being overcoated by a protective layer.

The coating compositions of the two antihalation layers and the protective layer have different rheological configuration, particularly in terms of different viscosity. The viscosity of the coating composition of the second antihalation layer is higher than the viscosity of both the coating composition of the first antihalation layer and the coating composition of the protective layer, in order to allow the coating composition of the second antihalation layer to improve the stability of the coating flow. Preferably, the viscosity of the coating composition of the first antihalation layer is in the range from about 5 to about 12 centipoise, the viscosity of the coating composition of the second antihalation layer is in the range from about 10 to about 30 centipoise and the viscosity of the coating composition of the protective layer is in the range from about 8 to about 20 centipoise.

The antihalation layers and the protective layer overcoating said antihalation layers used in the present invention contain the typical compounds and ingredients useful in such layers known in the art, such as binders, very fine gray or black silver filamentary or carbon black, colloidal silver, dyes, UV-absorbers, couplers and surfactants, such as those described in Research Disclosure, No. 17643 (December, 1978).

Useful binders include naturally occurring polymers such as gelatin and gelatin derivatives, and synthetic organic polymers such as polyvinyl alcohols and their derivatives, acrylamide polymers, polyvinylacetals, polyacrylates, and additional binders as described in *Research Disclosure*, 17643, paragraph IX, December 1978. Gelatin and gelatin derivatives are the preferred binders.

Preferably, the gelatin percentage of the coating composition of the first antihalation layer is in the range from about 3.5 to about 6, the gelatin percentage of the coating composition of the second antihalation layer is in the range from about 5 to about 10, and the gelatin percentage of the coating composition of the protective layer is in the range from about 4 to about 8. Accordingly, the resulting two antihalation layers and the protective layer would also preferably have different amounts of gelatin. The amount of gelatin in the first antihalation dry coated layer is generally from about 0.7 to 1.1 grams per square meters, preferably from about 0.8 to 1.0 grams per square meters; the amount of gelatin in the second antihalation dry coated layer is generally from about 1.2 to 1.7 grams per square meters, preferably from about 1.3 to 1.5 grams per square meters; the amount of gelatin in the protective dry coated layer is generally from about 0.8 to 1.2 grams per square meter, preferably from about 0.9 to 1.1 grams per square meters.

In addition, each of said first antihalation layer, second antihalation layer and protective layer can contain surfactant agents. Surfactants may be non-ionic, anionic, cationic, amphoteric. Non-ionic surfactants are, for example, saponin (steroid-based), alkyene oxide derivatives (for example, polyethylene glycol, a polyethylene glycol/polypropylene glycol condensate, polyethylene glycol alkyl ethers or polyethylene glycol alkylaryl ethers, polyethylene glycol esters, polyethylene glycol sorbitan esters, polyalkylene glycol alkylamines or polyalkylene glycol alkylamides, and silicone/polyethylene oxide adducts, and the like), glycidol derivatives (for example, alkenylsuccinic acid polyglyceride and alkylphenol polyglyceride, and the like), fatty acid esters of polyhydric alcohols and alkyl esters of sugar, and the like. Anionic surfactant contain, for example, an acidic group, such as a carboxy group, a sulfo group, a phospho group, a sulfuric acid esters group, and a phosphoric acid ester group, for example, alkylcarboxylic acid salts, alkylsulfonic acid salts, alkylbenzenesulfonic acid salts, alkylnaphthlenesulfonic acid salts, alkylsulfuric acid esters, alkylphosphoric acid esters, N-acyl-N-alkyltaurines, sulfosuccinic acid esters, sulfoalkylpolyoxyethylene alkylphenyl ethers, and polyoxyethylene alkylphosphoric acid esters. Cationic surfactants contain, for example, alkylamine salts, aliphatic or aromatic quaternary ammonium salts, heterocyclic quaternary ammonium salts (for example, pyridinium and imidazolium) and aliphatic or heterocyclic phosphonium or sulfonium salts. Amphoteric surfactants contain, for example, amino acids, aminoalkylsulfonic acids, aminoalkylsulfuric acid or aminoalkylphosphoric acid esters, alkylbetaines, and amine oxides. In the present invention, preferred surfactants are the anionic surfactants. Particularly preferred surfactants include an alkali metal salt of an alkarylene sulfonic acid, such as the sodium salt of dodecyl benzene sulfonic acid or sodium salts of isopropylnaphthalene sulfonic acids, such as mixtures of di-isopropyl- and tri-isopropylnaphthalene sodium sulfonates; an alkali metal salt of an alkyl sulfuric acid, such as sodium dodecyl sulfate; or an alkali metal salt of an alkyl sulfosuccinate, such as sodium bis (2-ethylhexyl) succinic sulfonate.

Preferably, the protective layer contains a total amount of surfactant(s) that is higher than the total amount of surfactant(s) in the first antihalation layer and higher than the total amount of surfactant(s) in the second antihalation layer. The percentage of total surfactant(s) present in the coating composition of each of the first and the second antihalation layer is generally from about 0.001 to 0.100, preferably from about 0.01 to 0.05; while the percentage of total amount of surfactant(s) in the coating composition of the protective layer is generally from about 0.01 to 0.5, preferably from about 0.05 to 0.35. Accordingly, the resulting two antihalation layers and the protective layer would also preferably have different amount of surfactants. The total amount of surfactant(s) in each of the first and in the second antihalation layer is generally from about 0.0002 to 0.02, preferably from about 0.002 to 0.010 grams per square meter; while the total amount of surfactant(s) in the protective layer is generally from about 0.002 to 0.1, preferably from about 0.01 to 0.07 grams per square meter.

The antihalation layers and the protective layer used in the present invention preferably contains density correction dye formulations of the proper hue. Said density correction dyes are generally yellow dyes, magenta dyes and cyan dyes. In one preferred embodiment of this invention, the density correction dyes are coated in at least one of the first antihalation layer, the second antihalation layer and/or the protective layer overcoating said antihalation layers.

Preferred density correction yellow dyes are represented by the structural formula (I):

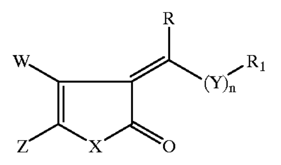

wherein R is hydrogen, substituted or unsubstituted alkyl group or substituted or unsubstituted aryl group, $R_1$ is aryl group or heterocyclic group; X is O or N—$R_2$ where $R_2$ is hydrogen or alkyl group; Y is N—$R_3$ where $R_3$ is hydrogen or alkyl group; n is 0 or 1; Z is hydrogen, alkyl group or aryl group; W is hydrogen, or W and Z, taken together, represent the atoms necessary to form an aryl group.

Preferred alkyl groups for R include alkyl containing 1 to 8 carbon atoms, including straight chain or branched chain alkyl, such as methyl, trifluoromethyl, ethyl, propyl, isopropyl, butyl, t-butyl and octyl. Preferred aryl groups for R include aryl of from 6 to 10 carbon atoms, such as phenyl and naphthyl. These alkyl and aryl groups may be substituted with any known substituents for alkyl and aryl groups, such as halogen, hydroxy, sulfo, sulfato, sulfonamido, carboxyl, amino, alkyl, alkoxy.

Preferred aryl groups for $R_1$ include an aryl group having from 6 to 10 carbon atoms, such as phenyl and naphthyl. These aryl groups may be substituted with any known substituents for aryl groups. Useful substituents for the aryl group include aryloxy (e.g., phenoxy, p-methoxyphenoxy, p-methylphenoxy, naphthyloxy, and tolyloxy); acylamino (e.g., acetamido, benzamido, butyramido, and t-butylcarbonamido); sulfonamido (e.g., methylsulfonamido, benzenesulfonamido, and p-toluylsulfonamido); sulfamoyl (e.g., N-methylsulfamoyl, N,N-diethylsulfamoyl, and N,N-di-methylsulfamoyl); carbamoyl (e.g., N-methylcarbamoyl, and N,N-dimethylcarbamoyl); arylsulfonyl (e.g., tolylsulfonyl); aryloxycarbonyl (e.g., phenoxycarbonyl); alkoxycarbonyl (i.e., alkoxycarbonyl containing 2 to 10 carbon atoms, for example methoxycarbonyl, ethoxycarbonyl, and benzyloxycarbonyl); alkoxy-sulfonyl (i.e., alkoxysulfonyl containing 2 to 10 carbon atoms, for example methoxysulfonyl, octyloxysulfonyl, and 2-ethylhexylsulfonyl; aryloxysulfonyl (e.g., phenoxysul-fonyl); alkylureido e.g., N-methylureido, N,N-dimethylureido, and N,N-dibutylureido); arylureido (e.g., phenylureido); alkyl; alkoxy; nitro; cyano; hydroxyl; sulfo; carboxyl; and sulfato. Examples of heterocyclic groups for R, include furan, thiophene, pyrrole, pyrazole, pyridine, benzofuran, imidazole and benzoimidazole. The heterocyclic groups may be substituted as described with respect to thearyl groups.

Preferred alkyl groups for $R_2$ and $R_3$ include alkyl from 1 to 4 carbon atoms, including straight chain or branched chain alkyl, such as methyl, ethyl, propyl, isopropyl, butyl, isobutyl, t-butyl. $R_2$ and $R_3$ may be substituted, for example with substituents as those described herein for R and $R_1$.

Preferred alkyl groups for Z include alkyl groups containing 1 to 8 carbon atoms, which may be substituted, as described above with respect to R. Preferred aryl groups for Z include aryl of from 6 to 10 carbon atoms, such as phenyl and naphthyl, which may be substituted, as described above with respect to R. When Z is hydrogen, alkyl group or aryl group, W is hydrogen. Among the substituents of groups on formula (I), the yellow dyes for use in the present invention may include solubilizing groups. Such solubilizing groups are known in the art and include, for example, sulfo, sulfato, carboxyl, and sulfonamido groups.

In a preferred embodiment, the yellow dyes for use in the present invention may include a ballasting group, i.e., an organic group of such size and configuration as to render the dye to which it is attached non-diffusible from the layer in which is coated in a photographic element. The ballasting group includes an organic hydrophobic residue having 8 to 32 carbon atoms bonded to the dye either directly or through a divalent linking group, such as an alkylene, imino, ether, thioether, carbonamido, sulfonamido, ureido, ester, imido, carbamoyl, and sulfamoyl group. Specific examples of suitable ballasting groups include alkyl groups (linear, branched, or cyclic), alkenyl groups, alkoxy groups, alkylaryl groups, alkylaryloxy groups, acylamidoalkyl groups, alkoxyalkyl groups, alkoxyaryl groups, alkyl groups substituted with an aryl group or a heterocyclic group, aryl groups substituted with an aryloxyalkoxycarbonyl group, and residues containing both an alkenyl or alkenyl long-chain aliphatic group and a carboxy or sulfo water-soluble group, as described, for example, in U.S. Pat. Nos. 3,337,344, 3,418,129, 3,892,572, 4,138,258, and 4,451,559, and in GB 1,494,777.

When the term "group" is used in this invention to describe a chemical compound or substituent, the described chemical material includes the basic group and that group with conventional substitution. Where the term "moiety" is used to describe a chemical compound or substituent, only the unsubstituted chemical material is intended to be included. For example, "alkyl group" includes not only such alkyl moiety as methyl, ethyl, butyl, octyl, stearyl, etc., but also moieties bearing substituent groups such as halogen, cyano, hydroxyl, nitro, amino, carboxylate, etc. On the other hand, "alkyl moiety" includes only methyl, ethyl, stearyl, cyclohexyl, etc.

Specific examples of densitiy correction yellow dyes for use in the present invention are illustrated below with their wavelength of maximum spectral absorption (λmax) measured in methanol, but the present invention should not be construed as being limited thereto.

(Y1)

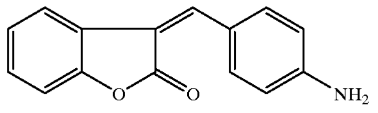

λmax = 426.0 nm (Y2)

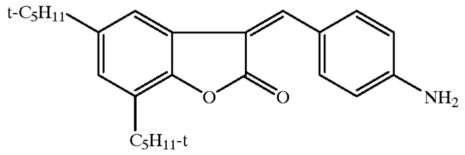

λmax = 426.0 nm (Y3)

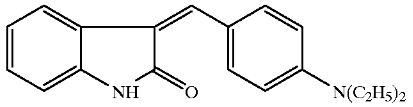

λmax = 442.0 nm (Y4)

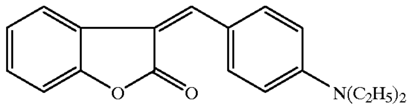

λmax = 456.0 nm (Y5)

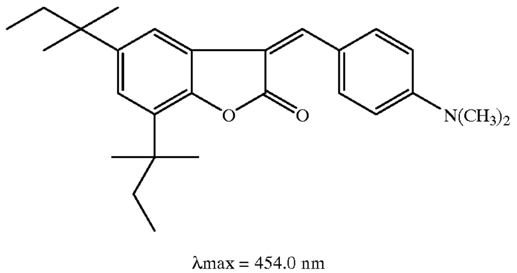

λmax = 454.0 nm

-continued (Y6)

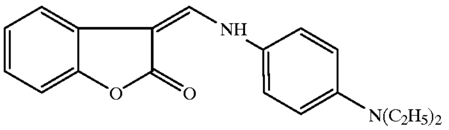

λmax = 409.2 nm (Y7)

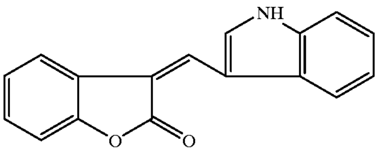

λmax = 418.8 nm (Y8)

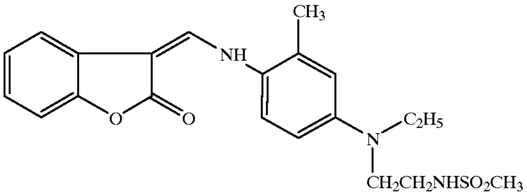

λmax = 407.0 nm (Y9)

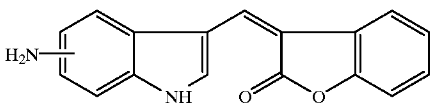

λmax = 439.2 nm (Y10)

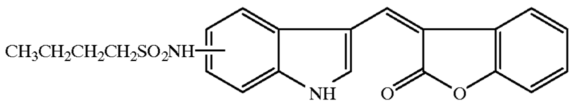

λmax = 421.2 nm (Y11)

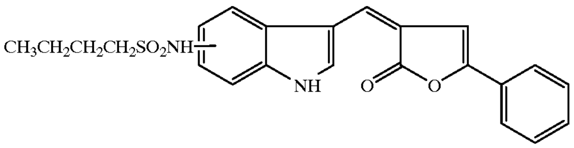

λmax = 434.0 nm

The density correction yellow dyes of formula (I) can be prepared according to procedures well known in the art of organic chemical dyes. The synthesis of dyes according to formula (I) is described, for example, in European Patent Application No. 921,435.

The density correction yellow dyes of formula (I) used in the present invention have their main absorption in the wavelength region of about 400 to 490, preferably 430 to 460 nm.

As stated above, in one preferred embodiment of this invention the density correction dyes are coated in at least one of the first antihalation layer, the second antihalation layer and/or the protective layer overcoating said antihalation layers. Preferably, the density correction yellow dyes are coated in the first antihalation layer and/or in the second antihalation layer.

The amount of density correction yellow dyes contained in said first antihalation layer and second antihalation layer is generally in the range from 0.1 to 1.5, preferably from 0.2 to 1.0 grams per square meters, while the amount of density correction yellow dyes contained in said protective layer is preferable to be a little lower than in the first and in the second antihalation layer, being generally in the range from 0 to 1.0, preferably from 0 to 0.5 grams per square meters.

Preferred density correction magenta dyes are azo-magenta dyes represented by the structural formula (II):

(II)

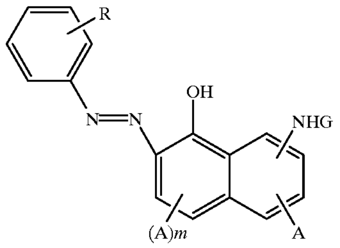

wherein A is a water soluble group, m is an integer of 0 or 1, G represents an acyl group or an alkylsulfonyl group, preferably having 1 to 4 carbon atoms, or an arylsulfonyl group, preferably having 6 to 8 carbon atoms, and R represents a ballast group. Examples of water soluble groups include, for example, —SO3M and —COOM where M is a hydrogen atom or a cation. Particularly useful cations include alkali metal cations such as, for example, sodium and potassium, and N-containing cations such as, for example, ammonium, methylammonium, ethylammonium, diethylammonium, triethylammonium, ethanolammonium, diethanolammonium, and the like, as well as species that can be derived by neutralizing carboxylic and sulfonic acid groups with cyclic amines such as, for example, pyridine, piperidine, aniline, toluidine, p-nitroaniline, and the like.

Specific examples of density correction magenta azo dyes for use in the present invention are illustrated below, but the present invention should not be construed as being limited thereto.

M1

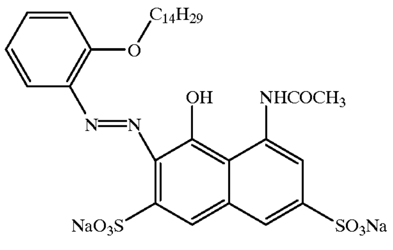

M2

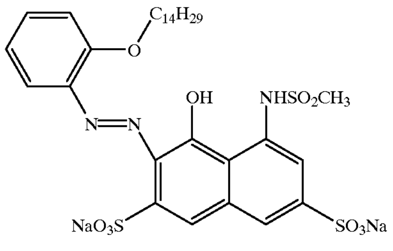

-continued

M3

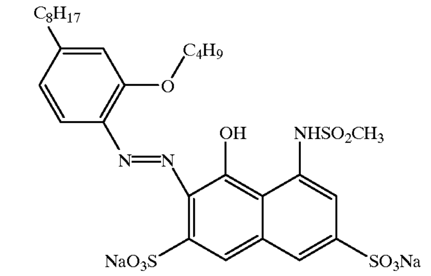

M4

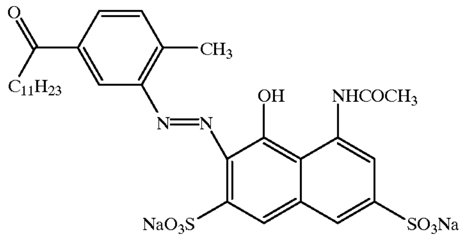

M5

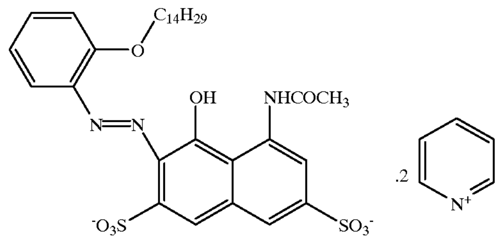

M6

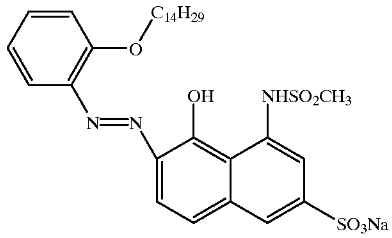

M7

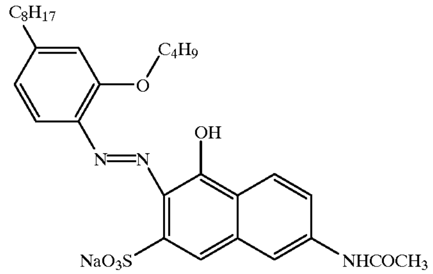

M8

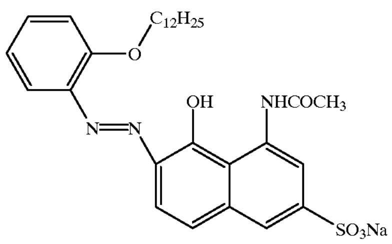

The density correction magenta dyes of formula (II) can be prepared according to procedures well known in the art of organic chemical dyes. The synthesis of dyes according to formula (II) is described, for example, in European Patent Application No. 725,313.

The density correction magenta dyes of formula (II) used in the present invention have their main absorption in the wavelength region of about 500 to 600 nm with a sharp absorption curve.

In one preferred embodiment of this invention, the density correction magenta dyes are coated in the second antihalation layer and/or in the protective layer.

The amount of density correction magenta dyes contained in said first antihalation layer is very low, generally in the range from 0 to 2.0, preferably from 0 to 1.0 grams per square meters, while the amount of density correction magenta dyes contained in said second antihalation layer and in said protective layer is preferable to be a little higher than in the first antihalation layer, being generally in the range from 0.1 to 3.0, preferably from 0.5 to 2.0 grams per square meters.

Preferred density correction cyan dyes are azomethine dyes represented by the structural formula (III):

(III)

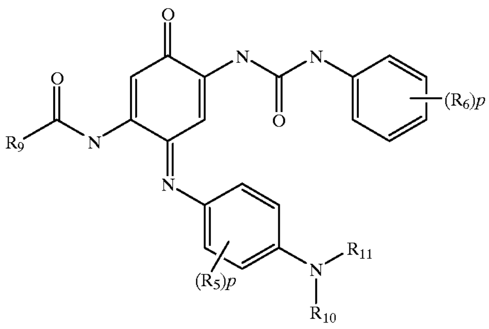

wherein $R_5$ is hydrogen, halogen, an alkyl group having 1 to 4 carbon atoms, an aryl group having 6 to 10 carbon atoms or an alkoxy group having 1 to 3 carbon atoms; $R_6$ is hydrogen, an alkyl group having 1 to 4 carbon atoms, an alkoxy group having 1 to 3 carbon atoms, halogen, cyano group, $S0_2R_7$, $C00R_7$, $SO_2OR_7$, $COR_7$, $SO_2NR_7R_8$ $CONR_7R_8$; $R_7$ is an alkyl group having 1 to 4 carbon atoms or an aryl group having 6 to 10 carbon atoms; $R_8$ is hydrogen or $R_7$, $R_7$ and $R_8$ together may form a five-membered or six-membered, optionally substituted ring; $R_9$ is a conventional ballast group; $R_{10}$ and $R_{11}$, being the same or different, are hydrogen, an alkyl group having 1 to 4 carbon atoms, an aryl group having 6 to 10 carbon atoms or an alkoxy group having 1 to 3 carbon atoms; p is 0 or 1. Preferred ballast groups, alkyl groups aryl groups are for example those described above for the general formulas (I) and/or (II).

Specific examples of density correction cyan azomethine dyes for use in the present invention are illustrated below, but the present invention should not be construed as being limited thereto.

C1

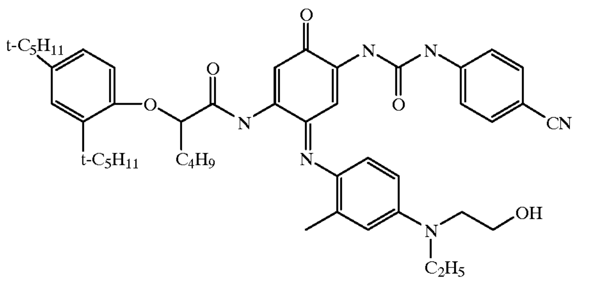

C2

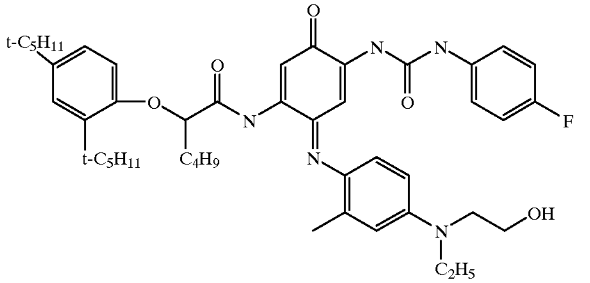

C3

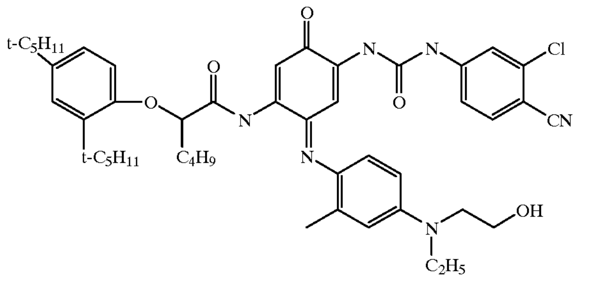

The density correction cyan dyes of formula (III) can be prepared according to procedures well known in the art of organic chemical dyes. The synthesis of dyes according to formula (III) is described, for example, in U.S. Pat. No. 5,108,883.

The density correction dyes corresponding to the general formulae (III) are distinguished by a suitable longwave absorption in the red spectral region between 650 and 730 nm as well as by narrow half band widths and low side densities in the green spectral region.

In one preferred embodiment of this invention, the density correction cyan dyes are in the protective layer overcoating the first and second antihalation layers.

The amount of density correction cyan dyes contained in said first antihalation layer is very low, generally in the range from 0 to 2.0, preferably from 0 to 1.0 grams per square meters, while the amount of density correction cyan dyes contained in said second antihalation layer and in said protective layer is preferable to be a little higher than in the first antihalation layer, being generally in the range from 0.1 to 3.0, preferably from 0.5 to 2.0 grams per square meters.

The support useful for the present invention can be, for example, cellulose esters supports (e.g., cellulose triacetate supports), paper supports, polyesters film supports (e.g., polyethylene terephthalate film supports or polyethylene naphthalate film supports), and the like, as described in Research Disclosure 308119, Section XVII, 1989. In one preferred embodiment of this invention, the support is a cellulose triacetate support.

The support base of the present invention can be used in the manufacture of light-sensitive photographic elements. Useful examples of light-sensitive photographic elements are represented by radiographic films, such as mammographic films, graphic art films, such as imagesetting films, and color films, such as color negative photographic films, color reversal photographic films, color positive photographic films, false color address photographic films (such as those disclosed in U.S. Pat. No. 4,619,892) and the like. According to a preferred embodiment, the support base of the present invention is used in the manufacture of silver halide multilayer color photographic elements.

The silver halide multilayer color photographic elements comprise, coated on a support, a red-sensitive silver halide emulsion layer associated with cyan dye-forming color couplers, a green-sensitive silver halide emulsion layer associated with magenta dye-forming color couplers and a blue-sensitive silver halide emulsion layer associated with yellow dye-forming color couplers. Each red-, green- and blue-sensitive layer is usually comprised of multiple (two or more) emulsion sub-layers sensitive to a given region of visible spectrum. When multilayer materials contain multiple blue, green or red sub-layers, these can be in any case relatively faster and relatively slower sub-layers. These elements additionally comprise other non-light sensitive layers, such as intermediate layers, filter layers and protective layers, thus forming a multilayer structure. These color photographic elements, after imagewise exposure to actinic radiation, are processed in a chromogenic developer to yield a visible color image. The layer units can be coated in a layer arrangement comprising the red-sensitive layers coated nearest the support and overcoated by the green-sensitive layers, a yellow filter layer and the blue-sensitive layers.

Suitable color couplers are preferably selected from the couplers having diffusion preventing groups, such as groups having a hydrophobic organic residue of about 8 to 32 carbon atoms, introduced into the coupler molecule in a non-splitting-off position. Such a residue is called a "ballast group". The ballast group is bonded to the coupler nucleus directly or through an imino, ether, carbonamido, sulfonamido, ureido, ester, imido, carbamoyl, sulfamoyl bond, etc. Examples of suitable ballasting groups are described in U.S. Pat. No. 3,892,572.

Said non-diffusible couplers are introduced into the light-sensitive silver halide emulsion layers or into non-light-sensitive layers adjacent thereto. On exposure and color development, said couplers give a color which is complementary to the light color to which the silver halide emulsion layers are sensitive. Consequently, at least one non-diffusible cyan-image forming color coupler, generally a phenol or an α-naphthol compound, is associated with red-sensitive silver halide emulsion layers, at least one non-diffusible magenta image-forming color coupler, generally a 5-pyrazolone or a pyrazolo-triazole compound, is associated with green-sensitive silver halide emulsion layers and at least one non-diffusible yellow image forming color coupler, generally an acylacetanilide compound, is associated with blue-sensitive silver halide emulsion layers.

Said color couplers may be 4-equivalent and/or 2-equivalent couplers, the latter requiring a smaller amount of silver halide for color production. As it is well known, 2-equivalent couplers derive from 4-equivalent couplers since, in the coupling position, they contain a substituent which is released during coupling reaction. 2-equivalent couplers which may be used in silver halide color photographic elements include both those substantially colorless and those which are colored ("masking couplers"). The 2-equivalent couplers also include white couplers which do not form any dye on reaction with the color developer oxidation products. The 2-equivalent color couplers include also DIR couplers which are capable of releasing a diffusing development inhibiting compound on reaction with the color developer oxidation products.

The most useful cyan-forming couplers are conventional phenol compounds and α-naphthol compounds. Examples of cyan couplers can be selected from those described in U.S. Pat. Nos. 2,369,929; 2,474,293; 3,591,383; 2,895,826; 3,458,315; 3,311,476; 3,419,390; 3,476,563 and 3,253,924; in GB 1,201,110, and in Research Disclosure 308119, Section VII, 1989.

The most useful magenta-forming couplers are conventional pyrazolone type compounds, indazolone type compounds, cyanoacetyl compounds, pyrazoletriazole type compounds, etc, and particularly preferred couplers are pyrazolone type compounds. Magenta-forming couplers are described for example in U.S. Pat. Nos. 2,600,788, 2,983,608, 3,062,653, 3,127,269, 3,311,476, 3,419,391, 3,519,429, 3,558,319, 3,582,322, 3,615,506, 3,834,908 and 3,891,445, in DE patent 1,810,464, in DE patent applications 2,408,665, 2,417,945, 2,418,959 and 2,424,467 and in JP patent applications 20,826/76, 58,922/77, 129,538/74, 74,027/74, 159,336/75, 42,121/77, 74,028/74, 60,233/75, 26,541/76 and 55,122/78.

The most useful yellow-forming couplers which can be used in combination with the yellow dye-forming couplers described hereinbefore are conventional open-chain ketomethylene type couplers. Particular examples of such couplers are benzoyl acetanilide type and pivaloyl acetanilide type compounds. Yellow-forming couplers that can be used are specifically described in U.S. Pat. Nos. 2,875,057, 3,235,924, 3,265,506, 3,278,658, 3,369,859, 3,408,194, 3,415,652 3,528,322, 3,551,151, 3,682,322, 3,725,072 and 3,891,445, in DE 2,219,917, 2,261,361 and 2,414,006, in GB 1,425,020, in JP 10,783/76, 26,133/72, 73,147/73, 102,636/76, 6,341/75, 123,342/75, 130,442/75, 1,827/76, 87,650/75, 82,424/77 and 115,219/77, and in Research Disclosure 308119, Section VII, 1989.

Colored couplers can be used which include those described for example in U.S. Pat. Nos. 3,476,560, 2,521,908 and 3,034,892, in JP 2,016/69, 22,335/63, 11,304/67, 32,461/69, 26,034/76 and 42,121/77 and in DE 2,418,959. The light-sensitive silver halide color photographic element may contain high molecular weight color couplers as described for example in U.S. Pat. No. 4,080,211, in EP 27,284 and in DE 1,297,417, 2,407,569, 3,148,125, 3,217,200, 3,320,079, 3,324,932, 3,331,743, and 3,340,376, and in Research Disclosure 308119, Section VII, 1989.

Colored cyan couplers can be selected from those described in U.S. Pat. Nos. 3,934,802; 3,386,301 and 2,434,272, colored magenta couplers can be selected from the colored magenta couplers described in U.S. Pat. Nos. 2,434,272; 3,476,564 and 3,476,560 and in GB 1,464,361. Colorless couplers can be selected from those described in GB 861,138; 914,145 and 1,109,963 and in U.S. Pat. No. 3,580,722 and in Research Disclosure 308119, Section VII, 1989.

Also, couplers providing diffusible colored dyes can be used together with the above mentioned couplers for improving graininess and specific examples of these couplers are magenta couplers described in U.S. Pat. No. 4,366,237 and GB 2,125,570 and yellow, magenta and cyan couplers described in EP 96,873, in DE 3,324,533 and in Research Disclosure 308119, Section VII, 1989.

Also, among the 2-equivalent couplers are those couplers which carry in the coupling position a group which is released in the color development reaction to give a certain photographic activity, e.g. as development inhibitor or accelerator, either directly or after removal of one or further groups from the group originally released. Examples of such 2-equivalent couplers include the known DIR couplers as well as DAR and FAR couplers. Typical examples of said couplers are described in DE 2,703,145, 2,855,697, 3,105,026, 3,319,428, 1,800,420, 2,015,867, 2,414,006, 2,842,063, 3,427,235, 3,209,110, and 1,547,640, in GB 953,454 and 1,591,641, in EP 89,843, 117,511, 118,087, and 301,477 and in Research Disclosure 308119, Section VII, 1989.

Examples of non-color forming DIR coupling compounds which can be used in silver halide color elements include those described in U.S. Pat. Nos. 3,938,996; 3,632,345; 3,639,417; 3,297,445 and 3,928,041; in German 2,405,442; 2,523,705; 2,460,202; 2,529,350 and 2,448,063; in Japanese 143,538/75 and 147,716/75, in GB 1,423,588 and 1,542,705 and 301,477 and in Research Disclosure 308119, Section VII, 1989.

In order to introduce the couplers into the silver halide emulsion layer, some conventional methods known to the skilled in the art can be employed. According to U.S. Pat. Nos. 2,322,027, 2,801,170, 2,801,171 and 2,991,177, the couplers can be incorporated into the silver halide emulsion layer by the dispersion technique, which consists of dissolving the coupler in a water-immiscible high-boiling organic solvent and then dispersing such a solution in a hydrophilic colloidal binder under the form of very small droplets. The preferred colloidal binder is gelatin, even if some other kinds of binders can be used, Another type of introduction of the couplers into the silver halide emulsion layer consists of the so-called "loaded-latex technique". A detailed description of such technique can be found in BE 853,512 and 869,816, in U.S. Pat. Nos. 4,214,047 and 4,199,363 and in EP 14,921. It consists of mixing a solution of the couplers in a water-miscible organic solvent with a polymeric latex consisting of water as a continuous phase and of polymeric particles having a mean diameter ranging from 0.02 to 0.2 micrometers as a dispersed phase.

Another useful method is further the Fisher process. According to such a process, couplers having a water-soluble group, such as a carboxyl group, a hydroxy group, a sulfonic group or a sulfonamido group, can be added to the photographic layer for example by dissolving them in an alkaline water solution.

Useful methods of introduction of couplers into silver halide emulsions are described in Research Disclosure 308119, Section VII, 1989.

The silver halide emulsions used in the multilayer color photographic elements may be a fine dispersion (emulsion) of silver chloride, silver bromide, silver chloro-bromide, silver iodo-bromide and silver chloro-iodo-bromide grains in a hydrophilic binder. Preferred silver halides are silver iodo-bromide or silver iodo-bromo-chloride containing 1 to 20% mole silver iodide. In silver iodo-bromide emulsions or silver iodo-bromo-chloride, the iodide can be uniformly distributed among the emulsion grains, or iodide level can varied among the grains. The silver halides can have a uniform grain size or a broad grain size distribution. The silver halide grains may be regular grains having a regular crystal structure such as cubic, octahedral, and tetradecahedral, or the spherical or irregular crystal structure, or those having crystal defects such as twin plane, or those having a tabular form, or the combination thereof.

The term "cubic grains" is intended to include substantially cubic grains, that is grains which are regular cubic grains bounded by crystallographic faces (100), or which may have rounded edges and/or vertices or small faces (111), or may even be nearly spherical when prepared in the presence of soluble iodides or strong ripening agents, such as ammonia. Particularly good results are obtained with silver halide grains having average grain sizes in the range from 0.2 to 3 μm, more preferably from 0.4 to 1.5 μm. Preparation of silver halide emulsions comprising cubic silver iodobromide grains is described, for example, in Research Disclosure, Vol. 184, Item 18431, Vol. 176, Item 17644 and Vol. 308, Item 308119.

Other silver halide emulsions are those which employ one or more light-sensitive tabular grain emulsions. The tabular silver halide grains contained in the emulsion have an average diameter:thickness ratio (often referred to in the art as aspect ratio) of at least 2:1, preferably 2:1 to 20:1, more preferably 3:1 to 14:1, and most preferably 3:1 to 8:1. Average diameters of the tabular silver halide grains range from about 0.3 μm to about 5 μm, preferably 0.5 μm to 3 μm, more preferably 0.8 μm to 1.5 μm. The tabular silver halide grains have a thickness of less than 0.4 μm, preferably less than 0.3 μm and more preferably less than 0.2 μm.

The tabular grain characteristics described above can be readily ascertained by procedures well known to those skilled in the art. The term "diameter" is defined as the diameter of a circle having an area equal to the projected area of the grain. The term "thickness" means the distance between two substantially parallel main planes constituting the tabular silver halide grains. From the measure of diameter and thickness of each grain the diameter:thickness ratio of each grain can be calculated, and the diameter:thickness ratios of all tabular grains can be averaged to obtain their average diameter:thickness ratio. By this definition, the average diameter:thickness ratio is the average of individual tabular grain diameter:thickness ratios. In practice, it is simpler to obtain an average diameter and an average thickness of the tabular grains and to calculate the average diameter:thickness ratio as the ratio of these two averages. Whatever the used method may be, the average diameter:thickness ratios obtained do not greatly differ.

In the silver halide emulsion layer containing tabular silver halide grains, at least 15%, preferably at least 25%, and, more preferably, at least 50% of the silver halide grains are tabular grains having an average diameter:thickness ratio of not less than 2:1. Each of the above proportions, "15%", "25%" and "50%" means the proportion of the total projected area of the tabular grains having a diameter:thickness ratio of at least 2:1 and a thickness lower than 0.4 μm, as compared to the projected area of all of the silver halide grains in the layer.

It is known that photosensitive silver halide emulsions can be formed by precipitating silver halide grains in an aqueous dispersing medium comprising a binder, gelatin preferably being used as a binder.

The silver halide grains may be precipitated by a variety of conventional techniques. The silver halide emulsion can be prepared using a single-jet method, a double-jet method, or a combination of these methods or can be matured using, for instance, an ammonia method, a neutralization method, an acid method, or can be performed an accelerated or constant flow rate precipitation, interrupted precipitation, ultrafiltration during precipitation, etc. References can be found in Trivelli and Smith, The Photographic Journal, Vol. LXXIX, May 1939, pp. 330–338, T. H. James, The Theory of The Photographic Process, 4th Edition, Chapter 3, U.S. Pat. Nos. 2,222,264, 3,650,757, 3,917,485, 3,790,387, 3,716,276, and 3,979,213, Research Disclosure, December 1989, Item 308119 "Photographic Silver Halide Emulsions, Preparations, Addenda, Processing and Systems", and Research Disclosure, September 1976, Item 14987.

One common technique is a batch process commonly referred to as the double-jet precipitation process by which a silver salt solution in water and a halide salt solution in water are concurrently added into a reaction vessel containing the dispersing medium.

In the double jet method, in which alkaline halide solution and silver nitrate solution are concurrently added in the gelatin solution, the shape and size of the formed silver halide grains can be controlled by the kind and concentration of the solvent existing in the gelatin solution and by the addition speed. Double-jet precipitation processes are described, for example, in GB 1,027,146, and 1,302,405, U.S. Pat. Nos. 3,801,326, 4,046,376, 3,790,386, 3,897,935, 4,147,551, and 4,171,224.

The single jet method in which a silver nitrate solution is added in a halide and gelatin solution has been long used for manufacturing photographic emulsion. In this method, because the varying concentration of halides in the solution determines which silver halide grains are formed, the formed silver halide grains are a mixture of different kinds of shapes and sizes.

Precipitation of silver halide grains usually occurs in two distinct stages. In a first stage, nucleation, formation of fine silver halide grain occurs. This is followed by a second stage, the growth stage, in which additional silver halide formed as a reaction product precipitates onto the initially formed silver halide grains, resulting in a growth of these silver halide grains. Batch double-jet precipitation processes are typically undertaken under conditions of rapid stirring of reactants in which the volume within the reaction vessel continuously increases during silver halide precipitation and soluble salts are formed in addition to the silver halide grains.

In order to avoid soluble salts in the emulsion layers of a photographic material from crystallizing out after coating and other photographic or mechanical disadvantages (stickiness, brittleness, etc.), the soluble salts formed during precipitation have to be removed.

In preparing the silver halide emulsions, a wide variety of hydrophilic dispersing agents for the silver halides can be employed. As hydrophilic dispersing agent, any hydrophilic polymer conventionally used in photography can be advantageously employed including gelatin, a gelatin derivative such as acylated gelatin, graft gelatin, etc., albumin, gum arabic, agar agar, a cellulose derivative, such as hydroxyethylcellulose, carboxymethylcellulose, etc., a synthetic resin, such as polyvinyl alcohol, polyvinylpyrrolidone, polyacrylamide, etc. Other hydrophilic materials useful known in the art are described, for example, in Research Disclosure, Vol. 308, Item 308119, Section IX.

The silver halide grain emulsion can be chemically sensitized using sensitizing agents known in the art. Sulfur containing compounds, gold and noble metal compounds, and polyoxyalkylene compounds are particularly suitable. In particular, the silver halide emulsions may be chemically sensitized with a sulfur sensitizer, such as sodium thiosulfate, allylthiocyanate, allylthiourea, thiosulfinic acid and its sodium salt, sulfonic acid and its sodium salt, allylthiocarbamide, thiourea, cystine, etc.; an active or inert selenium sensitizer; a reducing sensitizer such as stannous salt, a polyamine, etc.; a noble metal sensitizer, such as gold sensitizer, more specifically potassium aurithiocyanate, potassium chloroaurate, etc.; or a sensitizer of a water soluble salt such as for instance of ruthenium, rhodium, iridium and the like, more specifically, ammonium chloropalladate, potassium chloroplatinate and sodium chloropalladite, etc.; each being employed either alone or in a suitable combination. Other useful examples of chemical sensitizers are described, for example, in Research Disclosure 17643, Section III, 1978 and in Research Disclosure 308119, Section III, 1989.

The silver halide emulsion can be spectrally sensitized with dyes from a variety of classes, including the polymethyne dye class, which includes the cyanines, merocyanines, complex cyanines and merocyanines, oxonols, hemioxonols, styryls, merostyryls, and streptocyanine.

The cyanine spectral sensitizing dyes include, joined by a methine linkage, two basic heterocyclic nuclei, such as those derived from quinoline, pyrimidine, isoquinoline, indole, benzindole, oxazole, thiazole, selenazole, imidazole, benzoxazole, benzothiazole, benzoselenazole, benzoimidazole, naphthoxazole, naphthothiazole, naphthoselenazole, tellurazole, oxatellurazole.

The merocyanine spectral sensitizing dyes include, joined by a methine linkage, a basic heterocyclic nucleus of the cyanine-dye type and an acidic nucleus, which can be derived from barbituric acid, 2-thiobarbituric acid, rhodanine, hydantoin, 2-thiohydantoin, 2-pyrazolin-5-one, 2-isoxazolin-5-one, indan-1,3-dione, cyclohexane-1,3-dione, 1,3-dioxane-4,6-dione, pyrazolin-3,5-dione, pentane-2,4-dione, alkylsulfonylacetonitrile, malononitrile, isoquinolin-4-one, chromane-2,4-dione, and the like.

One or more spectral sensitizing dyes may be used. Dyes with sensitizing maxima at wavelengths throughout the visible and infrared spectrum and with a great variety of spectral sensitivity curve shapes are known. The choice and relative proportion of dyes depends on the region of the spectrum to which sensitivity is desired and on the shape of the spectral sensitivity desired.

Examples of sensitizing dyes can be found in Venkataraman, *The chemistry of Synthetic Dyes*, Academic Press, New York, 1971, Chapter V, James, *The Theory of the Photographic Process*, 4th Ed., Macmillan, !977, Chapter 8, F. M. Hamer, *Cyanine Dyes and Related Compounds*, John Wiley and Sons, 1964, and in Research Disclosure 308119, Section III, 1989.

The silver halide emulsions can contain optical brighteners, antifogging agents and stabilizers, filtering dyes, hardeners, coating aids, plasticizers and lubricants and other auxiliary substances, as for instance described in Research Disclosure 17643, Sections V, VI, VIII, X, XI and XII, 1978, and in Research Disclosure 308119, Sections V, VI, VIII, X, XI, and XII, 1989.

The present invention will be illustrated with reference to the following examples, but it should be understood that these examples do not limit the present invention.

EXAMPLE 1

Samples 1 (reference) and 2–4 (invention) have been prepared by coating on a transparent cellulose acetate film support having a thickness of 0.12 mm the following layers. The coating amounts are reported in grams per square meter ($g/m^2$), while the viscosity is expressed in centipoise.

| | |
|---|---|
| **Sample 1 (reference):** | |
| Layer 1 {First Antihalation Layer} | |
| Black colloidal silver | 0.19 |
| Gelatin | 1.34 |

-continued

| | |
|---|---|
| Yellow Dye (Y5) | 0.63 |
| Magenta Dye (M1) | 1.21 |
| Cyan Dye | 0.60 |
| Hostapur ™ sas 93 | 0.009 |
| Viscosity | 6 |
| Layer 2 {Protective Layer} | |
| Gelatin | 1.20 |
| Magenta Dye (M1) | 0.00 |
| Cyan Dye (C3) | 0.00 |
| Hostapur ™ sas 93 | 0.028 |
| Aerosol ™ ot 75 | 0.068 |
| Viscosity | 22 |
| **Sample 2 (invention):** | |
| Layer 1 {First Antihalation Layer} | |
| Black colloidal silver | 0.09 |
| Gelatin | 0.89 |
| Yellow Dye (Y5) | 0.63 |
| Magenta Dye (M1) | 1.21 |
| Cyan Dye (C3) | 0.60 |
| Hostapur ™ sas 93 | 0.008 |
| Viscosity | 6 |
| Layer 2 {Second Antihalation Layer} | |
| Black colloidal silver | 0.09 |
| Gelatin | 1.39 |
| Magenta Dye (M1) | 0.00 |
| Cyan Dye (C3) | 0.00 |
| Hostapur ™ sas 93 | 0.005 |
| Viscosity | 18 |
| Layer 3 {Protective Layer} | |
| Gelatin | 0.99 |
| Magenta Dye (M1) | 0.00 |
| Cyan Dye (C3) | 0.00 |
| Hostapur ™ sas 93 | 0.020 |
| Aerosol ™ ot 75 | 0.048 |
| Viscosity | 16 |
| **Sample 3 (invention):** | |
| Layer 1 {First Antihalation Layer} | |
| Black colloidal silver | 0.09 |
| Gelatin | 0.89 |
| Yellow Dye (Y5) | 0.63 |
| Magenta Dye (M1) | 1.21 |
| Cyan Dye (C3) | 0.60 |
| Hostapur ™ sas 93 | 0.008 |
| Viscosity | 6 |
| Layer 2 {Second Antihalation Layer} | |
| Black colloidal silver | 0.09 |
| Gelatin | 1.39 |
| Magenta Dye (M1) | 0.00 |
| Cyan Dye (C3) | 0.00 |
| Hostapur ™ sas 93 | 0.005 |
| Viscosity | 18 |
| Layer 3 {Protective Layer} | |
| Gelatin | 0.99 |
| Magenta Dye (M1) | 0.00 |
| Cyan Dye (C3) | 0.00 |
| Hostapur ™ sas 93 | 0.020 |
| Viscosity | 12 |
| **Sample 4 (invention):** | |
| Layer 1 {First Antihalation Layer} | |
| Black colloidal silver | 0.09 |
| Gelatin | 0.89 |
| Yellow Dye (Y5) | 0.63 |
| Magenta Dye (M1) | 0.00 |
| Cyan Dye (C3) | 0.00 |
| Hostapur ™ sas 93 | 0.008 |
| Viscosity | 6 |

-continued

| | |
|---|---|
| Layer 2 {Second Antihalation Layer} | |
| Black colloidal silver | 0.09 |
| Gelatin | 1.39 |
| Magenta Dye (M1) | 0.67 |
| Cyan Dye (C3) | 0.00 |
| Hostapur ™ sas 93 | 0.005 |
| Viscosity | 18 |
| Layer 3 {Protective Layer} | |
| Gelatin | 0.99 |
| Magenta Dye (M1) | 0.54 |
| Cyan Dye (C3) | 0.60 |
| Hostapur ™ sas 93 | 0.020 |
| Viscosity | 12 |

Hostapur ™ sas 93 is a C12–C14 alkyl sulfonate anionic surfactant, produced by Hoechst Co.
Aerosol ™ ot 75 is a sodium diethylexyl sulfosuccinate anionic surfactant, produced by CYANAMID EUROPA Co.

The Samples 1–4 have been coated with a slide coater, having a vacuum of 5 mm of water, the gap between the slide coater and the coating roll being 0.40 mm and the coating speed 150 meters per minute. The coating quality of Samples 1–4 has been evaluated by giving scholastic values from 1 to 10 (from the worst to the best), according to the consistency of mottle present. The results are shown in Table 1.

TABLE 1

| Samples | Coating quality |
|---|---|
| 1 (reference) | 4 |
| 2 (invention) | 6 |
| 3 (invention) | 7 |
| 4 (invention) | 8 |

Table 1 shows that reference Sample 1, containing only a first antihalation layer and a protective layer without the second antihalation layer, shows a bad coating quality. On the other hand, Samples 2–4 of the present invention, containing also the second antihalation layer, present good results. Sample 3, containing a reduced amount of surfactant in the protective layer, showed better results compared with Sample 2. Sample 4, similar to Sample 3 but that the magenta dye was contained in the second antihalation layer and in the protective layer, rather than in the first antihalation layer, in the same total amount, and the cyan dye was contained in the protective layer, rather than in the first antihalation layer, in the same amount, showed the best results.

What is claimed is:

1. A light-sensitive silver halide multilayer color photographic element having a support and blue-, green- and red-sensitive silver halide emulsion layers respectively associated with non-diffusing yellow, magenta and cyan dye-forming couplers, wherein at least two different antihalation layers overcoated by a protective layer are coated between the support and the emulsion layers, characterized in that a first antihalation layer is coated close to the support and a second antihalation is coated on said first antihalation layer, said second antihalation layers being overcoated by a protective layer, wherein the viscosity of the coating composition of said second antihalation layer is higher than the viscosity of the coating composition of said first antihalation layer and higher than the viscosity of the coating composition of said protective layer.

2. A support base for light-sensitive photographic elements characterized in that said support base comprises a support and at least two antihalation layers and a protective layer coated thereon, characterized in that a first antihalation layer is coated close to the support and a second antihalation is coated on said first antihalation layer, said second antihalation layers being overcoated by a protective layer, wherein the viscosity of the coating composition of said second antihalation layer is higher than the viscosity of the coating composition of said first antihalation layer and higher than the viscosity of the coating composition of said protective layer.

3. The support base of claim 2, wherein the viscosity of the coating composition of the first antihalation layer is in the range from about 5 to about 12 centipoise, the viscosity of the coating composition of the second antihalation layer is in the range from about 10 to about 30 centipoise, and the viscosity of the coating composition of the protective layer is in the range from about 8 to about 20 centipoise.

4. The support base of claim 2, wherein said first and second antihalation layers and said protective layer comprise a binder selected from the group consisting of gelatin or gelatin derivatives.

5. The support base of claim 4, wherein the amount of gelatin in said first antihalation layer is from about 0.7 to 1.1 grams per square meters, the amount of gelatin in said second antihalation layer is from about 1.2 to 1.7 grams per square meters, and the amount of gelatin in said protective layer is from about 0.8 to 1.2 grams per square meter.

6. The support base of claim 2, wherein said first antihalation layer, said second antihalation layer and said protective layer contain at least one surfactant selected from the group consisting of an anionic surfactants, cationic surfactants, non ionic surfactants and amphoteric surfactants.

7. The support base of claim 6, wherein the total amount of surfactant(s) in the protective layer is higher than the total amount of surfactants(s) in the first antihalation layer and higher than the total amount of surfactants(s) in the second antihalation layer.

8. The support base of claim 6, wherein the total amount of surfactant(s) in the first antihalation layer is in the range from about 0.0002 to 0.02 grams per square meter, the total amount of surfactant(s) in the second antihalation layer is in the range from about 0.0002 to 0.02 grams per square meter, and the total amount of surfactant(s) in said protective layer is in the range from about 0.002 to about 0.1 grams per square meter.

9. The support base of claim 2, wherein a dye is contained in at least one of said first antihalation layer, said second antihalation layer and said protective layer.

10. The support base of claim 9, wherein said dye is selected from the group consisting of yellow dyes, magenta dyes and cyan dyes.

11. The support base of claim 10, wherein said yellow dye is represented by formula:

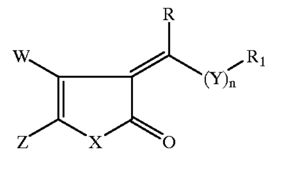

wherein R is hydrogen, substituted or unsubstituted alkyl group or substituted or unsubstituted aryl group, $R_1$, is aryl group or heterocyclic group; X is O or N—$R_2$ where $R_2$ is hydrogen or alkyl group; Y is N—$R_3$ where $R_3$ is hydrogen or alkyl group; n is 0 or 1; Z is hydrogen, alkyl group or aryl group; W is hydrogen, or W and Z, taken together, represent the atoms necessary to form an aryl group.

12. The support base of claim 10, wherein said magenta dye is represented by formula:

(II)

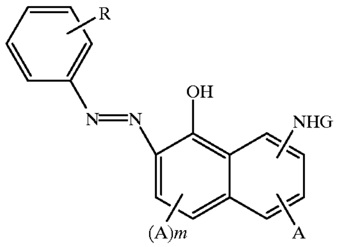

wherein A is a water soluble group, m is an integer of 0 or 1, G represents an acyl group or an alkylsulfonyl group, or an arylsulfonyl group, R represents a ballast group.

13. The support base of claim 10, wherein said cyan dye is represented by formula:

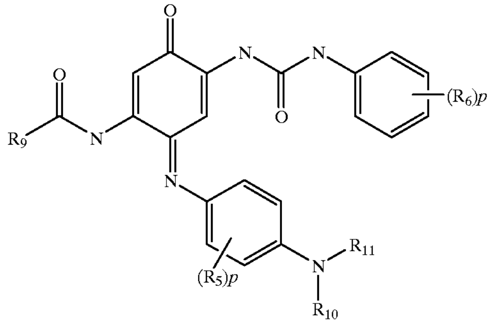

wherein $R_5$ is hydrogen, halogen, an alkyl group having 1 to 4 carbon atoms, an aryl group having 6 to 10 carbon atoms or an alkoxy group having 1 to 3 carbon atoms; $R_6$ is hydrogen, an alkyl group having 1 to 4 carbon atoms, an alkoxy group having 1 to 3 carbon atoms, halogen, cyano group, $SO_2R_7$, $COOR_7$, $SO_2OR_7$, $COR_7$, $SO_2NR_7R_8$ OR $CONR_7R_8$; $R_7$ is an alkyl group having 1 to 4 carbon atoms or an aryl group having 6 to 10 carbon atoms; $R_8$ is hydrogen or $R_7$, $R_7$ and $R_8$ together may form a five-membered or six-membered, optionally substituted ring; $R_9$ is a conventional ballast group; $R_{10}$ and $R_{11}$, being the same or different, are hydrogen, an alkyl group having 1 to 4 carbon atoms, an aryl group having 6 to 10 carbon atoms or an alkoxy group having 1 to 3 carbon atoms; p is 0 or 1.

* * * * *